H. P. HOOD & W. COOMBS.
Nut-Locks.
No. 135,553.  Patented Feb. 4, 1873.
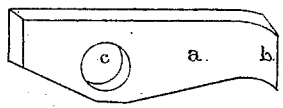
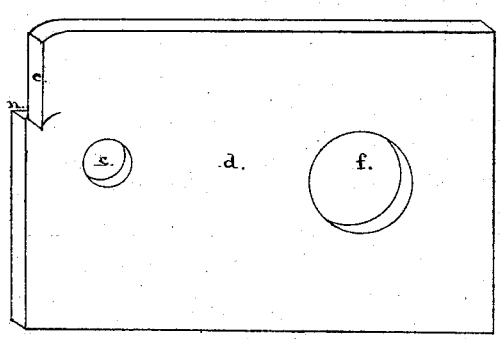
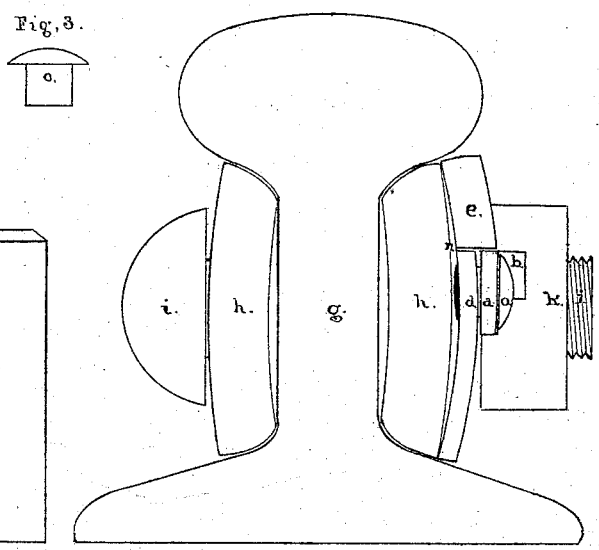
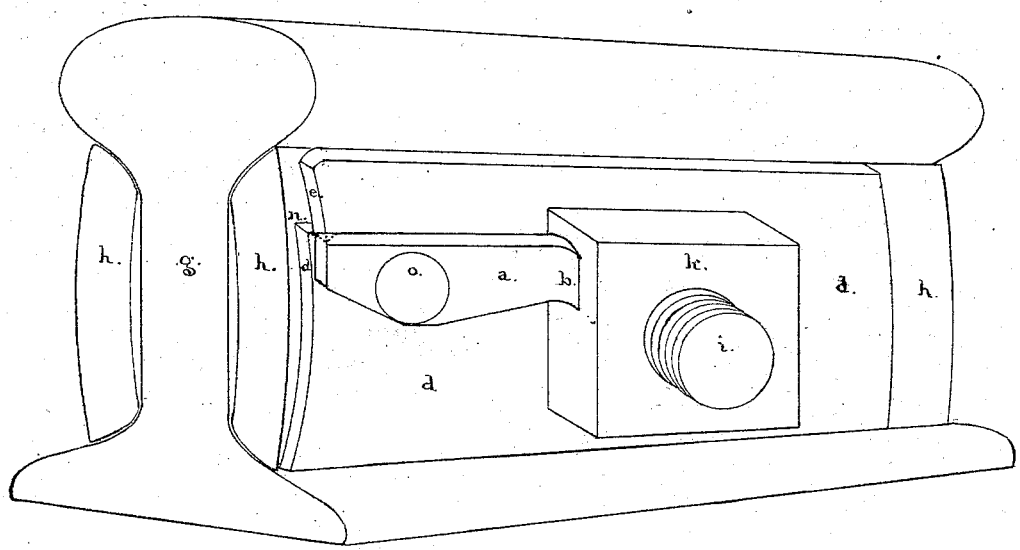
Witnesses:  Inventors:
Frazer S. Ells  Harrison P. Hood
Lynn B. Martindale  William Coombs

UNITED STATES PATENT OFFICE.

HARRISON P. HOOD, OF INDIANAPOLIS, INDIANA, AND WILLIAM COOMBS, OF BANGOR, MAINE.

IMPROVEMENT IN NUT-LOCKS.

Specification forming part of Letters Patent No. 135,553, dated February 4, 1873.

*To all whom it may concern:*

Be it known that we, HARRISON P. HOOD, of Indianapolis, county of Marion and State of Indiana, and WILLIAM COOMBS, of Bangor, county of Penobscot and State of Maine, have invented certain Improvements for Fastening Nuts by means of a button (in combination with a washer or otherwise) so placed as to prevent the nut from unscrewing.

*Description of the Accompanying Drawing.*

Figure 1 is an elevation of a button. Fig. 2 is an elevation of a washer. Fig. 3 is an elevation of a rivet. Fig. 4 is an elevation showing the application of the button as applied to the nut of a fish-bar bolt (used in coupling railroad bars) to prevent it from unscrewing. Fig. 5 is an end elevation of the same.

*General Description.*

Fig. 1—$a$ is a metal or other button, flat, or with the end turned up, as at $b$. $c$ is a hole for a rivet or screw.

Fig. 2—$d$ is a washer, curved or not, as required, cut in the end at $n$, and turned up, as at $e$, as a stop for the button. $c$ is a hole for a rivet or screw. $f$ is a hole for a bolt.

Fig. 3—$o$ is a rivet.

Fig. 4—$a$ is a button applied to a nut, $k$, and held to the washer $d$ by the rivet $o$; and $e$ is a bent portion of the washer $d$, and used for a stop for the button. $g$ is a portion of a railroad bar with a fish-bar, $h\ h$, on each side. $i$ is the end of a fish-bar bolt that has passed through the nut $k$.

Fig. 5 is an end elevation or section of the same.

*Claim.*

We claim—

The combination of the washer-plate $d$ provided with a lip, $e$, in connection with a button, $a$, turned up at the inner end $b$ to engage a nut, $k$, substantially as and for the purpose hereinbefore set forth.

HARRISON P. HOOD.
WILLIAM COOMBS.

Witnesses:
 FRAZER S. ELLIS,
 LYNN B. MARTINDALE.